US010460292B2

(12) United States Patent
Walker et al.

(10) Patent No.: US 10,460,292 B2
(45) Date of Patent: Oct. 29, 2019

(54) PREVENTING ACTIVITY DELAYS USING SMART DEVICE ANALYSIS

(71) Applicant: International Business Machines Corporation, Armonk, NY (US)

(72) Inventors: Keith R. Walker, Austin, TX (US); James E. Bostick, Cedar Park, TX (US); Danny Y. Chen, Austin, TX (US); Sarbajit Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/609,645

(22) Filed: May 31, 2017

(65) Prior Publication Data

US 2018/0349855 A1 Dec. 6, 2018

(51) Int. Cl.
*G06Q 10/10* (2012.01)
*G06Q 10/06* (2012.01)

(52) U.S. Cl.
CPC ... *G06Q 10/1095* (2013.01); *G06Q 10/06311* (2013.01); *G06Q 10/109* (2013.01); *G06Q 10/1097* (2013.01)

(58) Field of Classification Search
CPC ......... G06Q 10/1095; G06Q 10/06311; G06Q 10/109; G06Q 10/1097
USPC ...................................................... 705/7.19
See application file for complete search history.

(56) References Cited

U.S. PATENT DOCUMENTS

| 2001/0049617 | A1* | 12/2001 | Berenson | G06Q 10/107 709/201 |
| 2004/0094619 | A1* | 5/2004 | Silberberg | G06Q 20/127 235/382 |
| 2007/0118415 | A1* | 5/2007 | Chen | G06Q 10/02 705/5 |
| 2011/0076994 | A1* | 3/2011 | Kim | G06Q 10/109 455/414.2 |
| 2012/0060166 | A1 | 3/2012 | Jardine et al. | |
| 2012/0253484 | A1* | 10/2012 | Burich | G06F 19/3418 700/91 |
| 2013/0146659 | A1* | 6/2013 | Zhou | G06Q 20/355 235/380 |
| 2013/0252591 | A1 | 9/2013 | Sasaki et al. | |
| 2014/0074534 | A1* | 3/2014 | Hamilton | G06Q 10/10 705/7.19 |

(Continued)

OTHER PUBLICATIONS

Wearable feedback systems for rehabilitation Sung, Michael; Marci, Carl; Pentland, Alex. Journal of Neuro Engineering and Rehabilitation 2 (2005), 2 pgs.*

(Continued)

*Primary Examiner* — Timothy Padot
(74) *Attorney, Agent, or Firm* — Edward J. Wixted, III; Brian M. Restauro

(57) ABSTRACT

A future activity of a user is identified based on a calendar of the user. A current activity of the user is determined. An interest level of the user for the current activity is determined. A duration of the current activity is estimated. A determination is made that a scheduling conflict exists between the future activity of the user and the current activity of the user. The determination is based on the schedule of the user, the interest level of the user, and the duration of the current activity. A first notification is sent to the user.

20 Claims, 3 Drawing Sheets

(56) References Cited

U.S. PATENT DOCUMENTS

| | | | |
|---|---|---|---|
| 2015/0095086 A1* | 4/2015 | Gopinath | G06Q 10/1093 705/7.18 |
| 2015/0095355 A1* | 4/2015 | Patton | G06F 16/29 707/754 |
| 2016/0267439 A1* | 9/2016 | Bitran | G06Q 10/1093 |

OTHER PUBLICATIONS

Yang, Rong et al. PACP: A Position-Independent Activity Recognition Method Using Smartphone Sensors. Information 7.4: 72. MDPI AG. (2016), 2 pgs.*

Walker et al., "Preventing Activity Delays Using Smart Device Analysis", U.S. Appl. No. 15/854,903, filed Dec. 27, 2017, 2 pages.

IBM, "List of Patent Applications Treated As Related", Appendix P, dated Dec. 20, 2017, 2 pages.

"Succession Planning Solutions for Effective Succesion Planning", Management Study Guide, www.managementstudyguide.com/management_functions.htm, Apr. 18, 2017, 6 pages.

* cited by examiner

PREVENTING ACTIVITY DELAYS USING SMART DEVICE ANALYSIS

BACKGROUND

The present invention relates generally to the field of smart computing devices, and more particularly to preventing activity delays using analysis from smart computing devices.

The use of smart computing devices is increasing from year to year as more smart computing devices become available. There are many smart computing devices on the market today including smartphones, smart watches, fitness trackers and other wearable technology, tablet computers, smart televisions, smart digital video recorders, security cameras, and smart automobiles. Many smart computing device are connected to one another via a personal network in a home and the Internet of Things (IoT). The IoT is the inter-networking of physical devices, vehicles (also referred to as "connected devices" and "smart devices"), buildings, and other items—embedded with electronics, software, sensors, actuators, and network connectivity that enable these objects to collect and exchange data.

SUMMARY OF THE INVENTION

Embodiments of the present invention include an approach for preventing activity delays using analysis from smart computing devices. In one embodiment, a future activity of a user is identified based on a calendar of the user. A current activity of the user is determined. An interest level of the user for the current activity is determined. A duration of the current activity is estimated. A determination is made that a scheduling conflict exists between the future activity of the user and the current activity of the user. The determination is based on the schedule of the user, the interest level of the user, and the duration of the current activity. A first notification is sent to the user.

DETAILED DESCRIPTION

Embodiments of the present invention provide for preventing activity delays using analysis from smart computing devices. Stated simply, people are busy. Between long work hours, significant others, children, other family, and friends, it is easy to become engrossed in one activity at the expense of another activity. For example, a person may be playing a video game with their child and forget to let the dog out next door. Several issues result from this forgetfulness—the neighbor comes home to a dirty carpet, the neighbor is irritated at the person, and the person receives a cleaning bill from the neighbor.

Embodiments of the present invention recognize that there is an approach for preventing activity delays using analysis from smart computing devices. In an embodiment, a smart computing device can determine a calendar of a user noting the days and times of various activities of the user. The smart computing device, or other smart computing devices, can monitor the current activity of the user, determine the duration of the current activity based on a history of the user, and recommend a change in the current activity to the user if a later activity of the user may be impacted by the current activity.

The present invention will now be described in detail with reference to the Figures.

Figure 1:
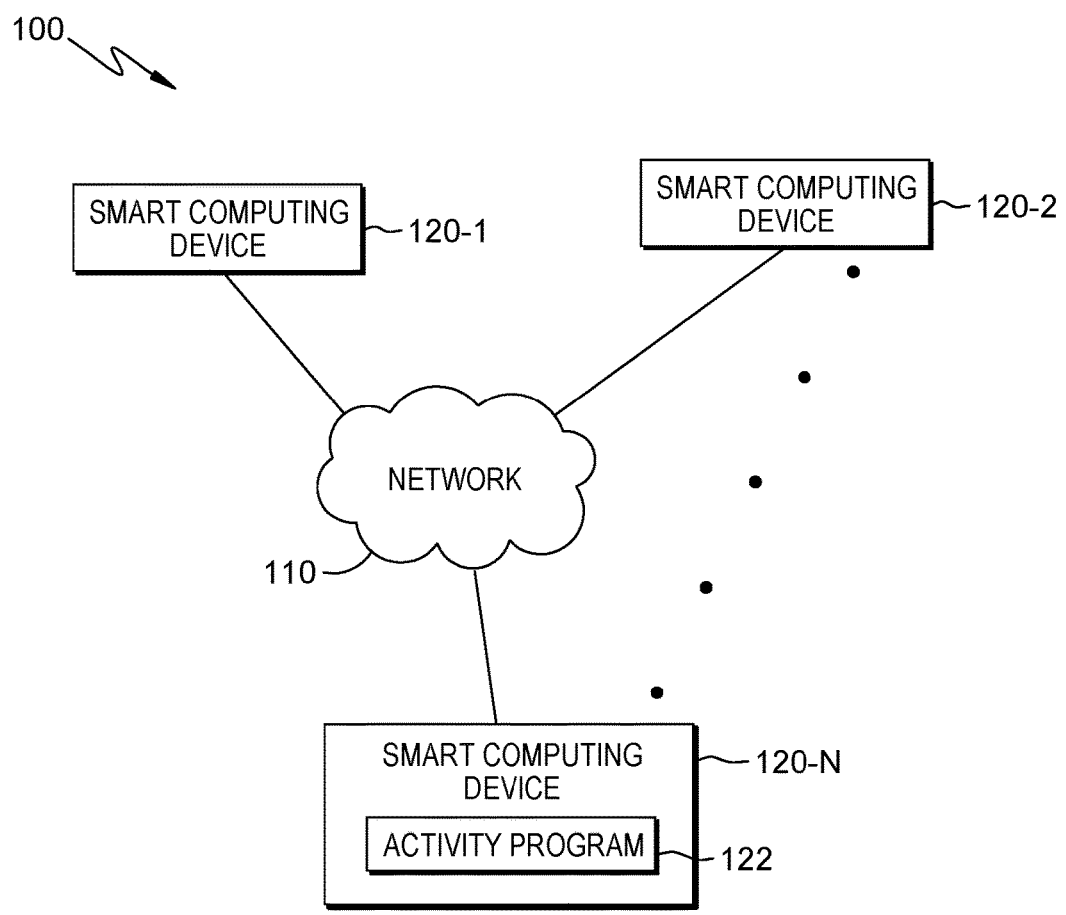
FIG. 1 depicts a functional block diagram of a computing environment, in accordance with an embodiment of the present invention.

FIG. 1 is a functional block diagram illustrating a computing environment, generally designated 100, in accordance with one embodiment of the present invention. FIG. 1 provides only an illustration of one implementation and does not imply any limitations with regard to the systems and environments in which different embodiments may be implemented. Many modifications to the depicted embodiment may be made by those skilled in the art without departing from the scope of the invention as recited by the claims.

In an embodiment, computing environment 100 includes smart computing device 120-1, smart computing device 120-2, and smart computing device 120-N, connected to network 110. In example embodiments, computing environment 100 may include other computing devices (not shown in FIG. 1) such as smartwatches, cell phones, smartphones, wearable technology, phablets, tablet computers, laptop computers, desktop computers, other computer servers or any other computer system known in the art, interconnected smart computing device 120-1, smart computing device 120-2, and smart computing device 120-N, over network 110.

In an embodiment of the present invention, smart computing device 120-1, smart computing device 120-2, and smart computing device 120-N connect to network 110, which enables smart computing device 120-1, smart computing device 120-2, and smart computing device 120-N to access other computing devices and/or data not directly stored on smart computing device 120-1, smart computing device 120-2, and smart computing device 120-N. Network 110 may be, for example, a short-range, low power wireless connection, a local area network (LAN), a telecommunications network, a wide area network (WAN) such as the Internet, or any combination of the three, and include wired, wireless, or fiber optic connections. Network 110 may include one or more wired and/or wireless networks that are capable of receiving and transmitting data, voice, and/or video signals, including multimedia signals that include voice, data, and video information. In general, network 110 can be any combination of connections and protocols that will support communications between smart computing device 120-1, smart computing device 120-2, smart computing device 120-N, and any other computing devices connected to network 110, in accordance with embodiments of the present invention. In an embodiment, data received by another computing device (not shown in FIG. 1) in computing environment 100 may be communicated to smart computing device 120-1, smart computing device 120-2, and smart computing device 120-N via network 110.

According to embodiments of the present invention, smart computing device 120-1, smart computing device 120-2, and smart computing device 120-N may be a laptop, tablet, or netbook personal computer (PC), a desktop computer, a personal digital assistant (PDA), a smartphone, a phablet, a smart watch, a fitness tracker or any other wearable technology, a smart television, a smart digital video recorder, a security camera, a smart automobile, or any other programmable electronic device capable of communicating with any other computing device within computing environment 100. In an embodiment, computing environment 100 includes any number of smart computing device 120-N which is representative of any smart computing device.

In certain embodiments, smart computing device 120-N represents a computer system utilizing clustered computers and components (e.g., database server computers, application server computers, etc.) that act as a single pool of seamless resources when accessed by elements of computing environment 100. In general, smart computing device 120-N is representative of any electronic device or combination of electronic devices capable of executing computer readable program instructions. Smart computing device 120-N may include components as depicted and described in further detail with respect to FIG. 3, in accordance with embodiments of the present invention.

According to an embodiment of the present invention, smart computing device 120-N includes one or more of the following features and/or components which are well known in the art: operating system, touchscreen, user interface, memory, applications (e.g., calendar, e-mail, weather), camera, motion sensors (e.g., accelerometer, gravity sensor, gyroscope), environmental sensors (e.g., temperature, humidity, wind, light, atmospheric pressure), position sensors (e.g., orientation sensor, magnetometer), biometric sensors (e.g., blood pressure, heart rate), and activity program 122.

According to embodiments of the present invention, activity program 122 may be a program, a subprogram of a larger program, an application, a plurality of applications, or mobile application software, which functions to prevent activity delays using analysis from smart computing devices. A program is a sequence of instructions written by a programmer to perform a specific task. Activity program 122 may run by itself but may be dependent on system software (not shown in FIG. 1) to execute. In one embodiment, activity program 122 functions as a stand-alone program residing on smart computing device 120-N. In another embodiment, activity program 122 may work in conjunction with other programs, applications, etc., found in computing environment 100. In yet another embodiment, activity program 122 may be found on other computing devices (not shown in FIG. 1) in computing environment 100, which are interconnected to smart computing device 120-N via network 110.

Figure 2:
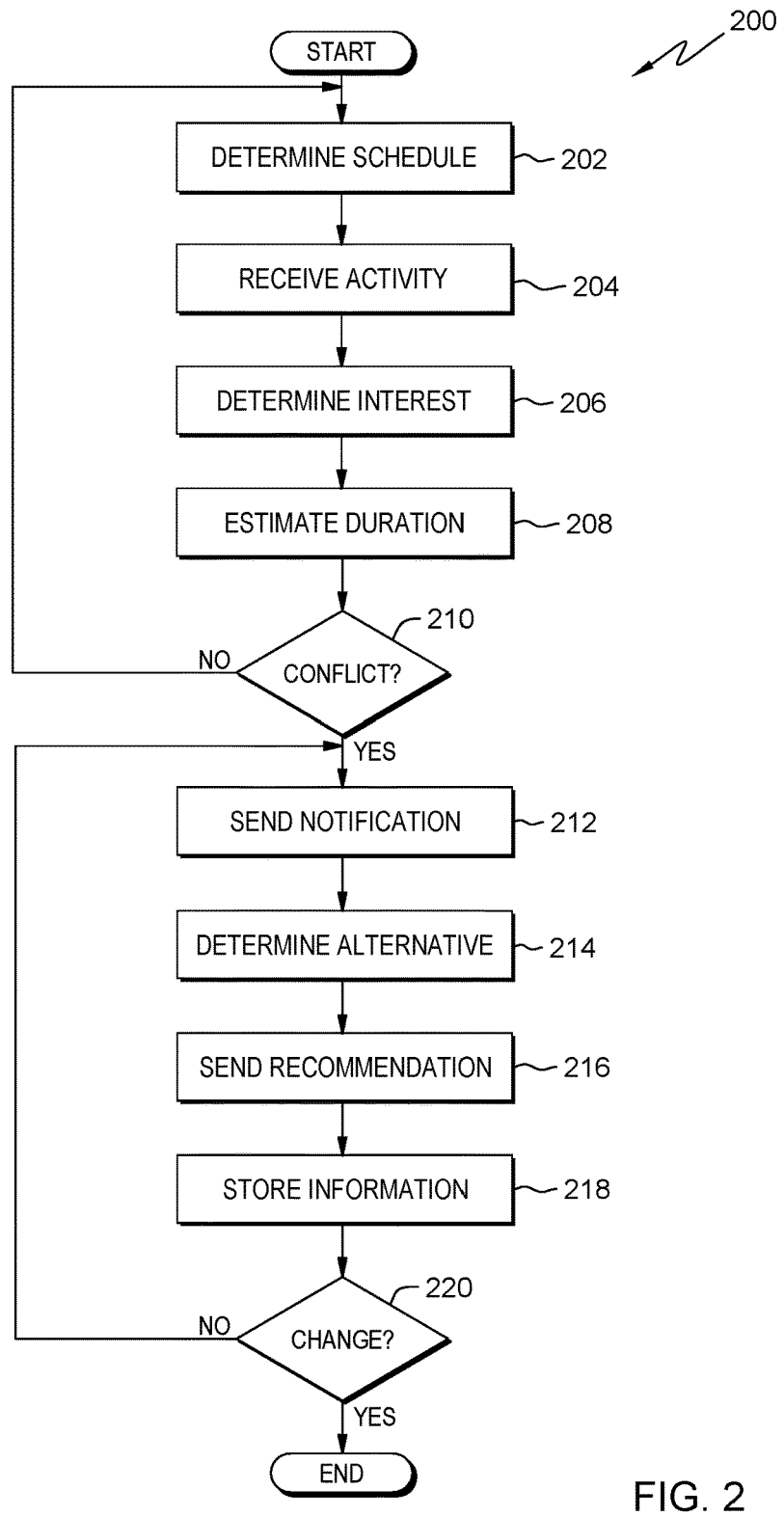
FIG. 2 depicts a flowchart of a program for preventing activity delays using analysis from smart computing devices, in accordance with an embodiment of the present invention.

FIG. 2 is a flowchart of workflow 200 depicting an approach for preventing activity delays using analysis from smart computing devices. In one embodiment, the method of workflow 200 is performed by activity program 122. In an alternative embodiment, the method of workflow 200 may be performed by any other program working with activity program 122. In an embodiment, a user, via an available user interface may invoke workflow 200 upon opening an application on mobile device 130. In an alternative embodiment, a user may invoke workflow 200 upon accessing activity program 122.

In an embodiment, activity program 122 determines schedule (step 202). In other words, activity program 122 determines the schedule of a user to identify scheduled future activities of the user in a pre-defined time period. In an embodiment, the pre-defined time period is determined by the user (e.g., eight hours). In another embodiment, the pre-defined time period is a default value in activity program 122 (e.g., twenty four hours). In an embodiment, activity program 122 determines the schedule of the user by checking an available calendar of the user. In the embodiment, if no activities are found on the calendar, activity program 122 checks the history of the user, which is stored to an available memory, to determine if the user historically has any activities for the pre-defined time period. In an embodiment, activity program 122 checks a calendar application and an information repository (i.e., memory) on smart computing device 120-N to determine the schedule of the user. For example, "Joe" is meeting a group of friends for a pickup basketball game at 4:00 PM and needs to leave the house by 3:30 PM. The current time is 3:00 PM, "Joe" is currently grading term papers, and "Joe" started the grading at 2:30 PM.

In an embodiment, activity program 122 receives activity (step 204). In other words, activity program 122 receives input from at least one feature of smart computing device 120-N to determine the current activity of the user. In an embodiment, features available in smart computing device 120-N include one or more of a camera, motion sensors (e.g., accelerometer, gravity sensor, gyroscope), environmental sensors (e.g., temperature, humidity, wind, light, atmospheric pressure), position sensors (e.g., orientation sensor, magnetometer), and biometric sensors (e.g., blood pressure, heart rate). In an embodiment, activity program 122 receives input from at least one feature of smart computing device 120-N to determine the current activity of the user. For example, the accelerometer of a smartphone owned by "Joe" is not picking up excessive movement so "Joe" is determined to be essentially stationary. Also, a security camera captures periodic images of "Joe" sitting at a desk grading the papers.

In an embodiment, activity program 122 determines interest (step 206). In other words, activity program 122 determines the interest of the user in the current activity of the user. In an embodiment, activity program 122 determines the interest of the user in the current activity by checking a historical database of activities of the user to ascertain how often the user performed the current activity. For example, if a user always watches a weekly television (TV) program on the same day at the same time, the interest of the user is likely high for watching the TV program. However, if a user is watching a weekly TV program for the first time and the program has been on for several months, the interest of the user is likely low for the first time TV program. In another embodiment, activity program 122 uses the biometrics of the user to determine the interest of the user in the current activity. For example, the blood pressure of a user may be higher when the user is watching a football game with the favorite team of the user compared to the blood pressure of the user when the user is watching a football game that does not include the favorite team of the user. In an embodiment, activity program 122 determines the interest of the user by checking a historical database stored to a memory included on smart computing device 120-N. For example, "Joe" grades papers twice a week so "Joe" is known to be keenly interested in grading.

In an embodiment, activity program 122 estimates duration (step 208). In other words, activity program 122 estimates the duration of the current activity of the user. The duration is the time remaining for the user to complete the current activity. In an embodiment, activity program 122 estimates the duration of the current activity by checking a historical database of the activities of the user to ascertain how long the current activity has taken in the past when performed by the user and then subtracting the amount of time already spent by the user on the current activity. For example, a user may historically play video games for a minimum of one hour and a maximum of three hours in a sitting and the average time played over the last year is two hours in a single sitting. In an embodiment, activity program 122 estimates the duration of the current activity of the user by checking a historical database stored to a memory included on smart computing device 120-N and subtracting the time spent by the user on the current activity. For example, "Joe" will regularly grade papers for two to three hours at a time and the average time "Joe" spends grading papers in a sitting this school year is one hour and forty-five minutes. In the example, "Joe" has already spent thirty minute grading papers so the duration remaining is one hour and fifteen minutes.

In an embodiment, activity program 122 determines conflict (decision step 210). In other words, activity program 122 determines whether a conflict exists between the determined schedule and the current activity taking into consideration the interest level and the determined duration. In an embodiment (decision step 210, NO branch), activity program 122 determines that a conflict does not exist; therefore, activity program 122 returns to step 202 to determine the schedule of the user. In the embodiment (decision step 210, YES branch), activity program 122 determines that a conflict does exist; therefore, activity program 122 proceeds to step 212 to send a notification.

According to an embodiment of the present invention, the conflict determination is made in all cases of schedule conflict, regardless of the level of interest of the user. According to another embodiment, the conflict determination is not made when the level of interest of the user is below a threshold for the current activity. In an embodiment, the level of interest of the user and the associated threshold is based on at least one of the following: at least one camera tracking the user (e.g., the user has left the room while watching a movie and has been gone for thirty minutes), a biometric (e.g., elevated blood pressure or heart rate) of the user, a motion sensor (e.g., movement detected by an accelerometer or gyroscope) of the user, and an environmental sensor (e.g., a change in temperature or light level in the location of the user). For example, a user may watch the baseball game of the week on Saturday afternoon. In one instance, the level of interest of the user is high as determined by the elevated pulse rate of the user. Here, conflict determination would be made. In another instance, the level of interest of the user is low as determined by the user changing channels often during the game. Here, conflict determination would not be made.

According to an embodiment of the present invention, the conflict determination is made in all cases regardless of the upcoming scheduled activity. According to another embodiment, the conflict determination is not made when the relative importance of the upcoming scheduled activity is below a threshold. In an embodiment, the relative importance of the upcoming scheduled activity and the associated threshold is based on at least one of the following: a history of the user (i.e., how the user has responded in the past to a similar conflict), a calendar of the user (e.g., the user makes a notation on the calendar of the user "cannot miss appointment" or the calendar entry is a "reminder" rather than an "appointment"), and a communication sent to the user by another user (e.g., the wife of the user sends a text to the user—"do not forget to go to the game"). For example, a user may have a weekly reminder on a calendar to take out the garbage at 7:00 on Tuesday evening. If the user is reading a book to a child prior to bedtime for the child, the conflict determination is not made since taking out the garbage "on time" is relatively unimportant compared to reading a child a bedtime story and getting the child to bed "on time". Stated another way, the garbage can be taken out late without any negative implications so the conflict determination is not required.

In an embodiment, activity program 122 sends notification (step 212). In other words, responsive to determining that a conflict exists between the determined calendar of a user and the current activity of the user, activity program 122 sends a notification to the user notifying the user of the conflict. According to various embodiments of the present invention, the notification may be in the form of an e-mail, a text message, a haptic notification (e.g., vibration), a visual notification (e.g., blinking notification light), and an audible notification (e.g., beeping, buzzing). In an embodiment, the notification may include no additional detail beyond an indication that there is a scheduling conflict. In another embodiment, the notification may include additional detail such as the scheduled activity that is causing the conflict with the current activity, the current time, the time of the scheduled activity creating the conflict, etc. In an embodiment, activity program 122 sends a notification to the user of a scheduling conflict. For example, "Joe" receives a text message on a smartphone indicating a scheduling conflict between grading papers and the basketball game. The text message also includes the following detail: grading papers started at 2:30, normal duration of grading papers is one hour, forty-five minutes which implies a completion time of 4:15, the current time is 3:00, and to be on time for the basketball game, "Joe" needs to leave the house at 3:30.

In an embodiment, activity program 122 determines alternative (step 214). In other words, responsive to determining that a conflict exists between the determined calendar of a user and the current activity of the user, activity program 122 determines at least one potential alternative for resolving the conflict. In an embodiment, the determination is based on the schedule of the user. In another embodiment, the determination is based on the history of the user. In an embodiment, activity program 122 reviews the schedule of the user and the history of the user stored to smart computing device 120-N and determines an alternative to resolving the scheduling conflict. For example, an alternative for "Joe" is to stop grading papers at 3:00 (the current time) so that "Joe" will not be late for the basketball game and for "Joe" to grade the papers at 9:00 the following morning as there are no activities scheduled for that day.

In an embodiment, activity program 122 sends recommendation (step 216). In other words, activity program 122 sends a recommendation to the user based on the determined alternatives for resolving the scheduling conflict. In an embodiment, the recommendation is sent as a text message and/or an e-mail. In an embodiment, activity program 122 sends a text message to smart computing device 120-N. For example, "Joe" receives a text message suggesting that "Joe" should stop grading papers now and start again at 9:00 the next morning.

In an embodiment, activity program 122 stores information (step 218). In other words, activity program 122 stores the information concerning the scheduling conflict. In an embodiment, the stored information includes the current activity, the upcoming activity in conflict with the current activity, the determined level of interest in the current activity, the estimated duration of the current activity, the notification sent to the user, the determined alternative(s) to resolve the scheduling conflict, and the sent recommendation. According to embodiments of the present invention, the information is stored locally on smart computing device 120-N, stored remotely on any smart computing device accessible via network 110, or stored both locally and remotely. In an embodiment, activity program 122 stores the information concerning the scheduling conflict to a memory on smart computing device 120-N. For example, information is stored on the smartphone owned by "Joe".

In an embodiment, activity program 122 determines change (decision step 220). In other words, activity program 122 determines whether the user changes or adjusts the current activity of the user based on the sent recommendation. In an embodiment (decision step 220, YES branch), activity program 122 determines that the user has changed the current activity; therefore, activity program 122 ends. In the embodiment (decision step 220, NO branch), activity program 122 determines that the user has not changed the current activity; therefore, activity program 122 returns to step 212 to send a second notification, after a pre-defined time period (e.g., five minutes, fifteen minutes, etc.) of the first notification, to the user regarding the scheduling conflict.

Additional use case examples are provided in the following paragraphs.

In a first example, a fitness tracker, which also monitors sleep patterns, determines that a user is taking a nap. The history of the user indicates that the user normally naps between 2:00 and 3:00 in the afternoon. However, that afternoon the user needs to go to the airport at 2:45 to pick up a friend. Activity program 122 determines the schedule conflict and sends an audible notice at 2:35 to a smart watch worn by the user. The user wakes up from the nap and is able to pick up the friend on time.

In a second example, a user is watching an all-time favorite soccer player, who the user has praised several times in social media, participate in an All-Star game. The user is monitored by security cameras (which determine that the user is in the room) and by a fitness tracker (which indicate the user is excited for the game because the blood pressure of the user is elevated from normal levels). A game of soccer lasts approximately just under two hours in duration and activity program 122 had determined a schedule conflict will occur for the user at about half-time of the game. A first notification is sent to the user recommending that the user record the game on a digital video recorder so that the user can watch the game at a later time. Activity program 122 determines that the user has not changed the activity of watching the game and has not recorded the game. A live game tracker monitoring the All-Star game determines that the all-time favorite player is no longer in the game (the player was ejected from the game for a red card). As activity program 122 prepares to send a second notification, activity program 122 determines that the blood pressure of the user, as indicated by the fitness tracker, has returned to normal and that security cameras can no longer determine that the user is in the room. Therefore, the second notification is cancelled because the possible schedule conflict is resolved.

In a third example, a user is out for a morning jog which the user does daily at 7:00 in the morning. Historically, the jog is completed by 8:30. It is confirmed that the user is jogging by both a global positioning system (GPS) and heart rate monitor on the smart watch of the user. Activity program 122 determines a schedule conflict because the cable company is scheduled to arrive at 8:15 to replace faulty equipment. Activity program 122 sends a notification to the user that the user should end the jog early because of the appointment. The timing of the notification is coordinated with the GPS so that the notification is sent at a point in time during the jog which allows the user to turn around and get back home in time for the appointment.

In a fourth example, a user is reading a novel on a tablet computer at 8:30 AM. The user is concentrating on the novel as documented by the limited eye movement of the user determined by the camera on the tablet computer. The user is cooking dinner for a significant other later in the day and the calendar of the user includes the phrase "thaw steaks in the morning". Activity program 122 is able to determine a potential scheduling conflict as activity program 122 has used natural language processing to "read" the calendar of the user. Also, activity program 122 has received an indication from the freezer, which is a smart device connected to the Internet of Things, that the freezer door has not been opened yet today. Therefore, activity program 122 has determined that the steaks have not been thawed as required in order for the dinner to be successful. Activity program 122 sends a notification to the user to remove the steaks from the freezer immediately.

Figure 3:
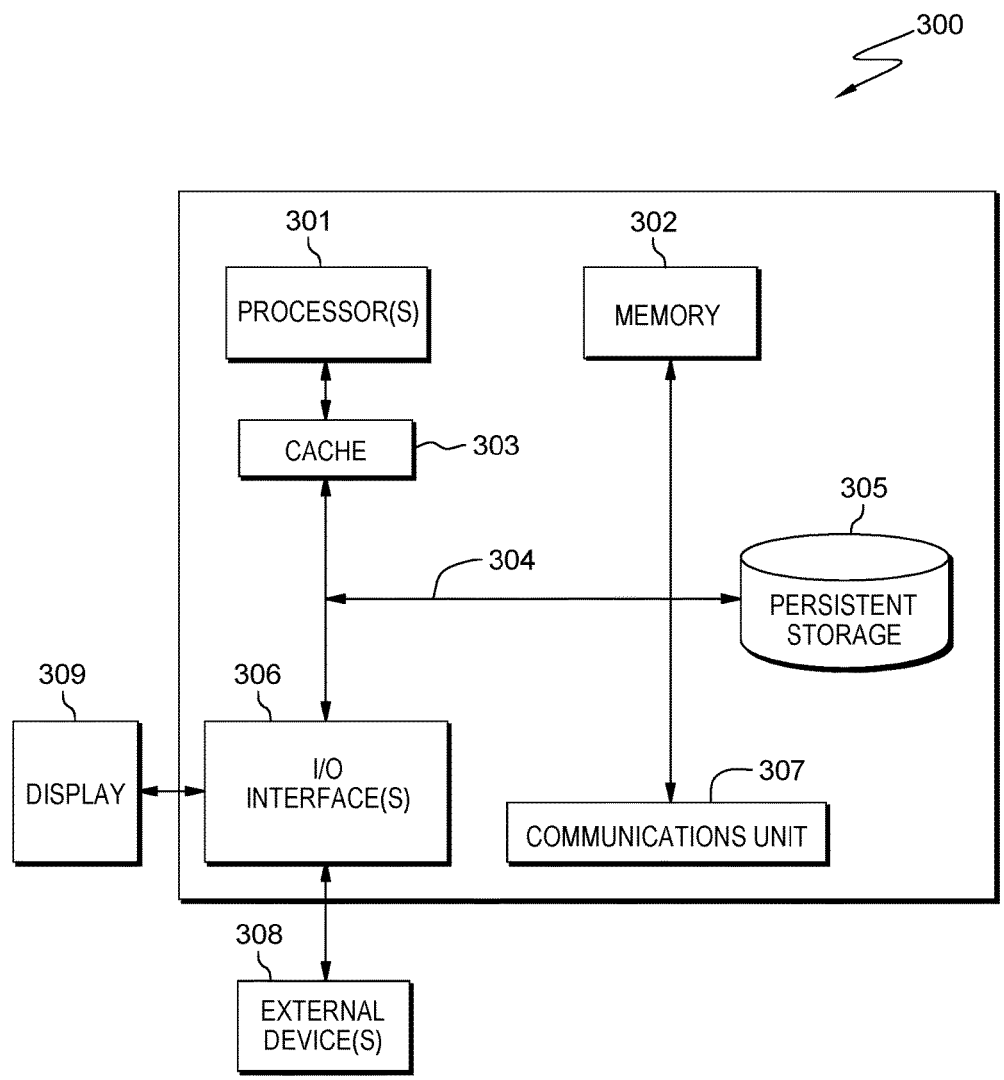
FIG. 3 depicts a block diagram of components of the computing environment of FIG. 1, in accordance with an embodiment of the present invention.

FIG. 3 depicts computer system 300, which is an example of a system that includes activity program 122. Computer system 300 includes processors 301, cache 303, memory 302, persistent storage 305, communications unit 307, input/output (I/O) interface(s) 306 and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processors 301 by holding recently accessed data, and data near recently accessed data, from memory 302.

Program instructions and data used to practice embodiments of the present invention may be stored in persistent storage 305 and in memory 302 for execution by one or more of the respective processors 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data used to practice embodiments of the present invention may be downloaded to persistent storage 305 through communications unit 307.

I/O interface(s) 306 allows for input and output of data with other devices that may be connected to each computer system. For example, I/O interface 306 may provide a connection to external devices 308 such as a keyboard, keypad, a touchscreen, and/or some other suitable input device. External devices 308 can also include portable computer readable storage media such as, for example, thumb drives, portable optical or magnetic disks, and memory cards. Software and data used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method, the method comprising:
   determining, by one or more processors of a biometric device, a heartrate and a blood pressure of a user, wherein the biometric device includes one or more sensors;
   predicting, by one or more computer processors, a future activity of a user based on a schedule of the user, the determined heartrate and blood pressure of the user, and a historical database of activities of the user, wherein
      the future activity of the user is an activity of a set of scheduled activities of the user in a pre-defined time period;
   determining, by the one or more computer processors, a current activity of the user based on the schedule of the user and a current biometric of the user;
   determining, by the one or more computer processors, an interest level of the user for the current activity based on the historical database of activities of the user and the current biometric of the user, wherein
      the historical database of activities of the user comprises historical biometrics of the user associated with past activities that match the current activity; and
      the current biometric is a continuous measurement of biometrics of the user while the user performs the current activity;
   determining, by the one or more computer processors, an expected interest level of the user for the future activity based on the historical database of activities;
   estimating, by the one or more computer processors, a duration of the current activity;
   determining, by the one or more computer processors, that a scheduling conflict exists between the future activity of the user and the current activity of the user based on the schedule of the user, the interest level of the user for the current activity, the expected interest level of the user for the future activity, the relative importance of the future activity compared to the current activity, and the duration of the current activity; and
   responsive to determining that the scheduling conflict exists, sending, by the one or more computer processors, a first notification to the user.

2. The method of claim 1, further comprising:
   determining, by the one or more computer processors, an alternative for the current activity, wherein the alternative resolves the scheduling conflict;
   responsive to determining that the user has not changed the current activity based on the first notification, sending, by the one or more computer processors a second notification to the user, wherein the second notification is sent after a pre-defined time period after the first notification; and
   wherein the first notification is a recommendation to the user based on the determined alternative.

3. The method of claim 1, further comprising:
   storing, by the one or more computer processors, information concerning the scheduling conflict, wherein the information concerning the scheduling conflict is selected from the group consisting of: the current activity, the future activity, the interest level of the user for the current activity, the duration of the current activity, the first notification sent to the user, an alternative for the current activity, and a recommendation based on the alternative.

4. The method of claim 1, wherein determining the current activity of the user comprises:
   receiving, by the one or more computer processors, at least one input from one or more components of a computing device; and
   determining, by the one or more computer processors, the current activity of the user based on the at least one input.

5. The method of claim 4, wherein the one or more components of the computing device is selected from a group consisting of a camera, a motion sensor, an environmental sensor, a position sensor, and a biometric sensor.

6. The method of claim 1, wherein determining the interest level of the user for the current activity, comprises:
   accessing, by the one or more computer processors, the historical database of activities of the user, wherein the historical database of activities comprises historical biometrics of the user associated with past activities that match the current activity;
   accessing, by the one or more computer processors, the one or more sensors of the biometric device during the current activity of the user;
   matching, by the one or more computer processors, the current biometric of the user to the accessed historical database of activities associated with the current activity of the user, wherein the current biometric is a continuous measurement of biometrics of the user while the user performs the current activity; and
   determining, by the one or more computer processors, the interest level of the user for the current activity based on the matched current biometric of the user and the historical database of activities associated with the current activity of the user.

7. The method of claim 1, wherein the first notification is selected from the group consisting of: an e-mail, a text message, a haptic notification, a visual notification, and an audible notification.

8. A computer program product for a biometric device for preventing activity delays, the computer program product comprising:
   one or more computer readable storage media; and
   program instructions stored on the one or more computer readable storage media, the program instructions comprising:
      program instructions to determine by a biometric device a heartrate and a blood pressure of a user, wherein the biometric device includes one or more sensors;

program instructions to predict a future activity of a user based on a schedule of the user, the determined heartrate and blood pressure of the user, and a historical database of activities of the user, wherein the future activity of the user is an activity of a set of scheduled activities of the user in a pre-defined time period;

program instructions to determine a current activity of the user based on the schedule of the user and a current biometric of the user;

program instructions to determine an interest level of the user for the current activity based on the historical database of activities of the user and the current biometric of the user, wherein the historical database of activities of the user comprises historical biometrics of the user associated with past activities that match the current activity, and the current biometric is a continuous measurement of biometrics of the user while the user performs the current activity;

program instructions to determine an expected interest level of the user for the future activity based on the historical database of activities;

program instructions to estimate a duration of the current activity;

program instructions to determine that a scheduling conflict exists between the future activity of the user and the current activity of the user based on the schedule of the user, the interest level of the user for the current activity, the expected interest level of the user for the future activity the relative importance of the future activity compared to the current activity, and the duration of the current activity; and responsive to determining that the scheduling conflict exists, program instructions to send a first notification to the user.

9. The computer program product of claim 8, further comprising program instructions stored on the one or more computer readable storage media, to:

determine an alternative for the current activity, wherein the alternative resolves the scheduling conflict;

responsive to determining that the user has not changed the current activity based on the first notification, send a second notification to the user, wherein the second notification is sent after a pre-defined time period after the first notification; and wherein the first notification is a recommendation to the user based on the determined alternative.

10. The computer program product of claim 8, further comprising program instructions stored on the one or more computer readable storage media, to:

store information concerning the scheduling conflict, wherein the information concerning the scheduling conflict is selected from the group consisting of: the current activity, the future activity, the interest level of the user for the current activity, the duration of the current activity, the first notification sent to the user, an alternative for the current activity, and a recommendation based on the alternative.

11. The computer program product of claim 8, wherein program instructions to determine the current activity of the user comprise:

program instructions to receive at least one input from one or more components of a computing device; and program instructions to determine the current activity of the user based on the at least one input.

12. The computer program product of claim 11, wherein the one or more components of the computing device is selected from a group consisting of: a camera, a motion sensor, an environmental sensor, a position sensor, and a biometric sensor.

13. The computer program product of claim 8, wherein program instructions to determine the interest level of the user for the current activity comprise:

program instructions to access the historical database of activities of the user, wherein the historical database of activities comprises historical biometrics of the user associated with past activities that match the current activity;

program instructions to access one or more sensors of the biometric device during the current activity of the user;

program instructions to match the current biometric of the user to the accessed historical database of activities associated with the current activity of the user, wherein the current biometric is a continuous measurement of biometrics of the user while the user performs the current activity; and program instructions to determine the interest level of the user for the current activity based on the matched current biometric of the user and the historical database of activities associated with the current activity of the user.

14. The computer program product of claim 8, wherein the first notification is selected from the group consisting of: an e-mail, a text message, a haptic notification, a visual notification, and an audible notification.

15. A computer system for a biometric device for preventing activity delays, the computer system comprising:

one or more computer processors;

one or more computer readable storage media; and program instructions stored on the one or more computer readable storage media for execution by at least one of the one or more computer processors, the program instructions comprising:

program instructions to determine by a biometric device a heartrate and a blood pressure of a user, wherein the biometric device includes one or more sensors;

program instructions to predict a future activity of a user based on a schedule of the user, the determined heartrate and blood pressure of the user, and a historical database of activities of the user, wherein the future activity of the user is an activity of a set of scheduled activities of the user in a pre-defined time period;

program instructions to determine a current activity of the user based on the schedule of the user and a current biometric of the user;

program instructions to determine an interest level of the user for the current activity based on the historical database of activities of the user and the current biometric of the user, wherein the historical database of activities of the user comprises historical biometrics of the user associated with past activities that match the current activity, and the current biometric is a continuous measurement of biometrics of the user while the user performs the current activity;

program instructions to determine an expected interest level of the user for the future activity based on the historical database of activities;

program instructions to estimate a duration of the current activity;

program instructions to determine that a scheduling conflict exists between the future activity of the user and the current activity of the user based on the schedule of the user, the interest level of the user for the current activity, the expected interest level of the user for the future activity the relative importance of the future activity compared to the current activity, and the duration of the current activity; and responsive to determining that the scheduling conflict exists, program instructions to send a first notification to the user.

16. The computer system of claim 15, further comprising program instructions stored on the one or more computer readable storage media for execution by at least one of the one or more computer processors, to:

determine an alternative for the current activity, wherein the alternative resolves the scheduling conflict;

responsive to determining that the user has not changed the current activity based on the first notification, send a second notification to the user, wherein the second notification is sent after a pre-defined time period after the first notification; and wherein the first notification is a recommendation to the user based on the determined alternative.

17. The computer system of claim 15, further comprising program instructions stored on the one or more computer readable storage media for execution by at least one of the one or more computer processors, to:

store information concerning the scheduling conflict, wherein the information concerning the scheduling conflict is selected from the group consisting of: the current activity, the future activity, the interest level of the user for the current activity, the duration of the current activity, the first notification sent to the user, an alternative for the current activity, and a recommendation based on the alternative.

18. The computer system of claim 15, wherein program instructions to determine the current activity of the user comprise:

program instructions to receive at least one input from one or more components of a computing device; and program instructions to determine the current activity of the user based on the at least one input.

19. The computer system of claim 18, wherein the one or more components of the computing device is selected from a group consisting of a camera, a motion sensor, an environmental sensor, a position sensor, and a biometric sensor.

20. The computer system of claim 15, wherein program instructions to determine the interest level of the user for the current activity comprise:

program instructions to access the historical database of activities of the user, wherein the historical database of activities comprises historical biometrics of the user associated with past activities that match the current activity;

program instructions to access one or more sensors of the biometric device during the current activity of the user;

program instructions to match the current biometric of the user to the accessed historical database of activities associated with the current activity of the user, wherein the current biometric is a continuous measurement of biometrics of the user while the user performs the current activity; and program instructions to determine the interest level of the user for the current activity based on the matched current biometric of the user and the historical database of activities associated with the current activity of the user.

* * * * *